United States Patent [19]

Yoo

[11] 3,725,373
[45] Apr. 3, 1973

[54] PROCESS FOR HOMOPOLYMERIZING ACRYLONITRILE

[75] Inventor: Jin Sun Yoo, South Holland, Ill.

[73] Assignee: Atlantic Richfield Company, New York, N.Y.

[22] Filed: Jan. 12, 1970

[21] Appl. No.: 2,373

[52] U.S. Cl. ........260/88.7 R, 252/431, 260/30.8 DS
[51] Int. Cl. .................................................C08f 3/76
[58] Field of Search........260/88.7 R, 88.7 C, 85.5 R, 260/85.5 M

[56] References Cited

UNITED STATES PATENTS

| | | | |
|---|---|---|---|
| 3,433,774 | 3/1969 | Bamford et al. | 260/85.5 M |
| 3,436,383 | 4/1969 | O'Brien et al. | 260/85.5 M |
| 3,475,395 | 10/1969 | Hsieh | 260/88.7 R |
| 3,117,111 | 1/1964 | Natta et al. | 260/88.7 R |
| 3,231,553 | 1/1966 | Chiang | 260/88.7 R |
| 3,436,383 | 4/1969 | O'Brien et al. | 260/88.7 R |

*Primary Examiner*—Harry Wong, Jr.
*Attorney*—Eugene L. Bernard, Martin J. Brown, John W. Behringer, James N. Dresser, W. Brown Morton, Jr., John T. Roberts and Malcolm L. Sutherland

[57] ABSTRACT

A process for the polymerization of acrylonitrile is provided using a catalyst which contains (A) an iron source, (B) an electron donor ligand, and (C) a reducing agent, in molar ratios of (B) to (A) of about 0.3 to 10:1 and of (C) to (A) of about 3 to 50:1. Preferred catalyst components are ferric acetylacetonate, bis(diphenylphosphino)-ethane and triethylaluminum.

10 Claims, No Drawings

PROCESS FOR HOMOPOLYMERIZING ACRYLONITRILE

This invention relates to the polymerization of acrylonitrile. More particularly, the invention relates to a process for the polymerization of acrylonitrile employing a catalyst composition which contains an iron source, an electron donor ligand and a reducing agent. Such catalyst compositions can be unsupported, or they can be supported on a suitable base.

Numerous catalysts have been disclosed in the prior art as suitable for the preparation of polymeric products of acrylonitrile. Polyacrylonitriles are used extensively in the manufacture of such materials as acrylic fibers, nitrile rubber products and various plastics. Properties of polyacrylonitrile include hardness, heat and fire resistance, solvent resistance and the ability to form oriented fibers and films. The polymerization reaction is usually initiated by "redox" catalysts but may also be initiated by peroxides, azo compounds, high energy radiation and strong bases. The polymers of this invention can be used in the manner of known polyacrylonitriles of comparable molecular weight.

It has now been found that complexes of iron with an electron donor ligand of hydrocarbon-substituted elements of Group VA of the periodic table, said elements having an atomic weight of 15 to 83, when combined with a reducing agent capable of reducing ferric acetylacetonate to an oxidation state of less than 2, preferably to essentially a zero state, provide a catalyst composition having highly desirable physical and chemical characteristics and, particularly, excellent catalytic activity and selectivity for the polymerization of acrylonitrile. To obtain such compositions, the catalyst-forming reactants are combined in a molar ratio of electron donor ligand to iron of about 0.3 to 10 or more to 1, preferably about 0.7 to 2:1, and a reducing agent to iron molar ratio of about 3 to 50 or more to 1, preferably about 4 to 40:1.

In the preparation of the catalyst composition of the present invention, the iron source can be provided by compounds of the metal which are at least slightly soluble in some solvent wherein the iron-Group VA ligand complex can be formed. Referred are the weak field ligand complexes, the ligands of which readily serve in solution as transfer agents. Suitable sources of the iron can include, for example, halides, e.g. $FeCl_3$, $FeBr_3$, $FeI_3$; hydrocarbyloxy ferric diacetates, i.e., $(RO)Fe(C_2H_{32})_2$ where R represents alkyl, aryl, aralkyl and the like groups; phosphine complexes, e.g. $Fe[(C_6H_5)_2PC_2H_4P(C_6H_5)_2]X_3$, where X is a halide. Also available as iron sources are chelates formed by the iron and weak field ligands, such as β- diketones or β -keto-carboxylic acid esters and salts of carboxylic acids. Examples of these types of iron sources include β -diketonato-iron (III), acetylacetonato-iron (III), propylacetonato-iron (III), benzoylacetonato-iron; chelates from β -ketocarboxylic acid esters; salts of saturated monocarboxylic acids, e.g. ferric octoate, ferric stearate, ferric phenylacetate, ferric phenylpropionate, and the like; salts of corresponding unsaturated monocarboxylic acids, e.g. ferric acrylate, ferric vinyl acetate, and the like; salts of unsaturated carboxylic acids, e.g. ferric adipate, and the like; salts of corresponding unsaturated carboxylic acids, e.g. ferric muconate and the like; salts of cyclic and aromatic carboxylic acids, e.g., ferric cyclohexane carboxylate, ferric benzoate, ferric phthalates, and the like; and alkoxycarboxylates, e.g. ferric methoxyacetate and the like. In addition the corresponding ferrous salts can be employed. Preferred as a source of iron is ferric acetylacetonate.

The electron donor ligand component employed in preparing the iron complex component of the catalyst of the present invention is preferably a multifunctional organophosphine, typically either a bis(diphenylphosphino)alkane or alkene. Multifunctional phosphines which can be employed include those having such structures as $R_2P(CH_2)_nPR_2$, $R_2PCH=CHPR_2$ and $R_2P(CH_2)_nOCH_2PR_2$ where R is a hydrocarbon radical, e.g., alkyl, aryl, alkaryl, aralkyl and cycloalkyl of from one to about 20 carbon atoms, preferably two to about six carbon atoms, and can be substituted with non-deleterious groups and $n=1$, 2, 3 or 4. Preferably R is devoid of olefinic or acetylenic unsaturation. Examples of such compounds are bis(diphenylphosphino)ethane, bis(diphenylphosphino)propane and bis(diphenylphosphino)ethylene. Alternatively, a triorganophosphine corresponding to the general formula $R_3P$ can be employed, wherein R is a hydrocarbon radical as described above for multifunctional phosphines; different R groups may, of course, be present in the same phosphine molecule. When the phosphine component contains aromatic groups it is generally preferred that these have mono-cyclic structures, e.g., that the groups be selected from phenyl, alkylphenyl, or phenylalkyl radicals. Triphenylphosphine is an example of such an aromatic phosphine component which can be employed in the catalyst composition of this invention.

Phosphines may also be replaced by other electron donor ligands such as, for example, alkyl, aryl, alkaryl, aralkyl, or cycloalkyl phosphites, arsines, stibines or bismuthines. Other monodentate or bidentate ligands containing nitrogen donating centers such as 2,2-bipyridyl, ethylenediamine, 1,10-phenanthroline, 8-aminoquinone or a Schiff base ligand may also be utilized. Other electron donor ligands which can be employed include ligands containing both phosphine and amine functional groups such as diethylaminoethyl diphenylphosphine, bis(diethylaminoethyl)phenylphosphine and bis(diphenylphosphinoethyl) ethylamine; ligands containing nitrogen or phosphorous and an olefinic double bond, such as 2-alkylphenyldiphenylphosphine, 2-propenylphenyldiphenylphosphine and the like; cyclic polyenes such as 1,5-cyclooctadiene, cyclooctatetraene and cyclopentadiene; and diphosphine oxides.

The reducing agent is supplied by a compound which is capable of reducing ferric acetylacetonate, preferably to an oxidation state lower than 1 and even to zero. Examples of reducing agents which are suitable in the catalyst composition of this invention include trialkylaluminums, monoalkoxydialkylaluminums, and dialkylaluminum hydrides wherein the alkyl and alkoxy groups contain up to about six carbon atoms; Grignard reagents; allyl and alkyl tin and zinc complexes; and compounds of the formula $MAlR_4$ and $MBeR_3$ wherein M is an alkali metal, e.g., sodium, lithium or potassium, and R is alkyl, for example, of two of six carbon atoms.

The relative proportions of the components of the catalyst composition, i.e., the iron, the reducing agent, and the electron donor ligand, determine the catalytic character of the composition. The amount of the reducing agent, e.g. triethylaluminum, can preferably vary in more or less direct proportion with the ratio of electron donor ligand-to-iron, generally increasing as the ligand is increased.

The preparation of the overall catalyst composition is preferably conducted by first forming the complex of the electron donor ligand and the iron source and then adding the reducing agent to a solution or suspension of that complex, in a suitable organic solvent. Suitable organic solvents for the final catalyst composition are those which are inert to the catalyst and which will not significantly enter into, or deleteriously affect, the eventual polymerization reaction. As specific examples thereof may be mentioned aromatic and aliphatic hydrocarbons and their halogenated, e.g. chlorinated, derivatives. Oxygen-containing solvents are generally to be avoided for this purpose. The catalyst can also be deposited on a support, such as activated carbon, etc.

Formation of the ligand-iron complex may be effected by simply mixing the two reactants in the presence of a suitable solvent for the complexing reaction. The mixing may be done at room temperature or at temperatures as high as about 300°F. The complex usually forms within about 20 to 40 minutes after mixing at elevated temperature. Suitable solvents for the complex-forming reaction include the same solvents as those which are suitable for use in the final catalyst composition. If desired, however, the complexing may be accomplished in a solvent which is unsuitable for use in the final composition; in this case the resultant complex will first be isolated from the reaction mixture and redissolved, or re-suspended, in a proper solvent which is inert to the final catalyst composition.

Thus, for example, one method of preparing a phoshine-iron complex can involve stirring, preferably at room temperature, a mixture of bis(diphenylphosphino)ethane, ferric acetylacetonate and toluene. After the resulting complex has been formed the reducing agent may then be added directly to the reaction mixture.

In another method the complex may be prepared by refluxing an alcohol, e.g. ethanol, solution of the phosphine, say bis(diphenylphosphino)ethane, and ferric acetylacetonate, preferably at a temperature of about 150° to 250°F., and isolating the resultant complex from the reactant mixture. This approach is often preferred where the iron reagent contains some water of hydration, as the water will be removed from the complex when the latter is separated from the alcohol solvent. The isolated complex can then be dissolved or suspended in a suitable inert solvent, e.g. toluene, and the reducing agent added thereto to form the catalyst composition of the present invention.

The addition to the complex solution of the reducing agent is preferably conducted in a dry, inert atmosphere, out of the presence of air, for instance in an autoclave. Within a relatively short period of time after admixing of the components, e.g. about 5 to 15 minutes, an active catalyst composition is formed which may be used to catalyze the polymerization of acrylonitrile.

Polymerization can be effected by contacting the acrylonitrile at an elevated temperature of, for instance, about 100° to 300°F., preferably about 160° to 180°F., which ordinarily can be maintained by the heat of reaction without external heating means. A pressure of about 0 to 500 psig, preferably about 60 to 140 psig, is suitable with the catalyst composition of the present invention. The amount of catalyst composition used in the reaction is sufficient to effect polymerization of the feed, and often is about 0.05 to 5 weight percent, preferably about 0.1 to 1 percent, of catalyst composition (not including the solvent therefor) based on the weight of acrylonitrile feed. It has also been found that when the catalyst is prepared on a high surface area support, such as, for example, activated carbon, still other advantages, such as ease of handling, accrue.

A solid polymer product is obtained by the process of this invention which is readily soluble in dimethyl sulfoxide, but insoluble in common organic solvents such as benzene, toluene and chlorobenzene. An average molecular weight of the polymeric product was determined from a dimethylsulfoxide solution of the product to be in the range of about 250 to 1,000 by a cryoscopic method. The degree of polymerization may be controlled to provide a product containing primarily lower molecular weight polymers. Information obtained from spectroscopic studies was not sufficient to allow the determination of a definite structure of the polymeric product. However, two different nitrile groups, i.e., $C\equiv N$ and $C=N$, were present.

The preparation and utilization of the catalyst composition of the present invention are illustrated by the following example:

A 300 cc. stainless steel autoclave equipped with an air driven magnetic stirrer was used as a reactor. Both 1.05 m. moles (millimoles) ferric acetylacetonate, $Fe(acac)_3$, and 1.02 m. moles bis(diphenylphosphino)ethane, $\phi_2PC_2H_4P\phi_2$ were charged to the reactor with toluene. After the reactor was purged with nitrogen for 30 minutes, a 32 percent toluene solution of triethylaluminum (38.4 m. moles) was injected into the system through a serum cap. The total amount of toluene added in the reactor was 35 ml. The system was allowed to form an active catalytic species with vigorous stirring for about 20 minutes. Acrylonitrile (55 ml., technical grade) was introduced to the catalyst solution and the reactor was tightly closed. The system was allowed to react with vigorous agitation under a pressure of 60–140 psig and a temperature of 160°–180 °F. for a 3.5 hour period. A rusty brown-colored precipitate was removed from the autoclave together with a very small amount of liquid. The discharged reaction mixture was treated with dilute (approximately 6N) hydrochloric acid to destroy the catalytic component present in the product. A finely powdered yellow product was separated from the mixture and washed successively with water, then with alcohol and finally with ether. The isolated product was dried overnight in a vacuum oven at 170°F. to give a bright yellow solid in the form of a very fine powder. The following three studies of the dried sample were carried out to characterize the polymeric product.

Molecular Weight Determination

Using a dimethylsulfoxide solution of the product, molecular weight was determined to be approximately 680 by a cryoscopic method, indicating that about 13 monomer units per chain participated in the polymerization reaction. The product is readily soluble in dimethylsulfoxide although it is insoluble or only sparingly soluble in common organic solvents.

Infrared Spectrum

An infrared spectrum of the polymeric product taken in a Nujol mull showed two strong bands at 4.4 and 5.95 microns, indicating the presence of $C \equiv N$ and $C=N$ structures respectively. A third band at 6.1 microns could be due to $C=C$ or to $C=N$ in a different environment from that of the $C=N$ band at 5.95 microns, or it could be due to a combination of both $C=C$ and $C=N$ bands. There also appeared to be NH,—OH and a carbonyl band present as well.

Proton Nuclear Magnetic Resonance Spectrum

Three poorly resolved peaks were observed in the proton NMR spectrum of the product, in the approximate ratios of 3:4:4. The first peak fell in the region common to —$OCH_x$ protons found in esters. The second peak was typical of —$NCH_x$ protons and the third peak could be $CH_x$ protons which are alpha to a double bonded carbon.

It is claimed:

1. A process for the preparation of polyacrylonitrile by the polymerization of acrylonitrile which comprises contacting acrylonitrile monomer at a temperature of about 100° to 300°F. with a catalyst composition consisting essentially of the reaction product of a complex of
  A. a ferric compound which is at least slightly soluble in a solvent employed to form the iron-ligand complex, and
  B. an electron donor ligand of a hydrocarbon-substituted phosphorus compound having a formula of the structure:

$R_3P, R_2P(CH_2)_nPR_2, R_2PCH=CHPR_2$ and $R_2P(CH_2)_n OCH_2PR_2$ wherein R is an alkyl, aryl, alkaryl, aralkyl or cycloalkyl radical of from one to about 20 carbon atoms and $n$ is an integer having the value of from 1 to 4, with
  C. an organic reducing agent capable of reducing ferric acetylacetonate to an oxidation state of less than 2 and selected from the group consisting of trialkylaluminum compounds, monoalkoxydialkylaluminum compounds, and dialkylaluminum hydrides wherein the alkyl and alkoxy groups contain up to about six carbon atoms; Grignard reagents; allyl and alkyl tin and zinc complexes; and compounds of the formula $MAlR_4$ and $MBeR_3$ wherein M is an alkali metal and R is alkyl of two to six carbon atoms; said reactants being combined in a molar ratio of B to A of about 0.3 to 10:1 and a molar ratio of C to A of about 3 to 50:1.

2. The process of claim 1 wherein the mole ratio of B to A is about 0.7 to 2:1 and of C to A is about 4 to 40:1.

3. The process of claim 1 wherein C is an aluminum alkyl compound.

4. The process of claim 1 wherein B is a phosphine of the formula $R_2P(CH_2)_nPR_2$, in which R is hydrocarbon of two to about six carbon atoms and $n$ is a number from 1 through 4.

5. The process of claim 4 wherein the iron reactant is ferric acetylacetonate.

6. The process of claim 4 wherein B is bis(diphenylphosphino)ethane.

7. The process of claim 4 wherein C is triethylaluminum.

8. The process of claim 1 wherein (B) is an organo phosphine.

9. The process of claim 1 wherein (A) is ferric acetylacetonate and (B) is an organo phosphine.

10. The process of claim 1 wherein (A) is ferric acetylacetonate, (B) is bis(diphenylphosphino)ethane, and (C) is triethylaluminum.

* * * * *